(12) United States Patent  
Chung et al.

(10) Patent No.: US 7,057,698 B2  
(45) Date of Patent: Jun. 6, 2006

(54) LIQUID CRYSTAL DISPLAY PANEL OF HORIZONTAL ELECTRIC FIELD APPLYING TYPE INCLUDING PLURALITY OF PIXELS DIVIDED INTO AT LEAST FOUR SUB-PIXELS

(75) Inventors: In-Jae Chung, Kwacheon-shi (KR); Heume Il Baek, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/747,689

(22) Filed: Dec. 30, 2003

(65) Prior Publication Data

US 2004/0227890 A1   Nov. 18, 2004

(30) Foreign Application Priority Data

May 15, 2003   (KR) .................... 10-2003-0030955

(51) Int. Cl.
*G02F 1/1343* (2006.01)
*G02F 1/1337* (2006.01)
*G02F 1/1335* (2006.01)

(52) U.S. Cl. .................... 349/141; 349/106; 349/129

(58) Field of Classification Search ............. 349/106, 349/141, 129  
See application file for complete search history.

(56) References Cited

U.S. PATENT DOCUMENTS

| 6,226,116 | B1 * | 5/2001 | Dowe et al. ............... 359/281 |
| 6,266,116 | B1 * | 7/2001 | Ohta et al. ................. 349/141 |
| 6,888,604 | B1 * | 5/2005 | Rho et al. .................. 349/146 |
| 2002/0093027 | A1 * | 7/2002 | Zhong et al. .............. 257/98 |
| 2004/0046725 | A1 * | 3/2004 | Lee ............................. 345/88 |

FOREIGN PATENT DOCUMENTS

| KR | 10-2000-0057022 | 9/2000 |
| KR | 10-2000-0059637 | 10/2000 |

* cited by examiner

*Primary Examiner*—Tarifur R. Chowdhury  
(74) *Attorney, Agent, or Firm*—McKenna Long & Aldridge LLP (57) ABSTRACT

The present invention relates to a liquid crystal display panel of a horizontal electric field applying type capable of improving a viewing angle and a brightness. The liquid crystal display panel having an applied horizontal electric field includes a plurality of pixels, wherein each pixel includes sub-pixels of red, green, blue and white, and wherein a liquid crystal alignment direction of each sub-pixel is different between vertically adjacent sub-pixels.

20 Claims, 9 Drawing Sheets

LIQUID CRYSTAL DISPLAY PANEL OF HORIZONTAL ELECTRIC FIELD APPLYING TYPE INCLUDING PLURALITY OF PIXELS DIVIDED INTO AT LEAST FOUR SUB-PIXELS

This application claims the benefit of Korean Patent Application No. P2003-30955, filed on May 15, 2003, which is hereby incorporated by reference for all purposes as if fully set forth herein.

BACKGROUND OF THE INVENTION

1. Field of the Invention

The present invention relates to a liquid crystal display panel and more particularly to a liquid crystal display panel having an applied horizontal electric field that is capable of improving viewing angle and brightness.

2. Description of the Related Art

A liquid crystal display displays pictures by adjusting the light transmittance of a liquid crystals using an electric field. Liquid crystal displays are classified into a vertical electric field type and a horizontal electric field type in accordance with a direction of the electric field driving the liquid crystal.

The liquid crystal display having an applied horizontal electric field in which a common electrode formed on an upper substrate and a pixel electrode formed on a lower substrate are arranged to face each other, drives a liquid crystal of a twisted nematic mode (TN) by a vertical electric field formed between the common electrode and the pixel electrode. The liquid crystal display having the applied horizontal electric field has an advantage of a large aperture ratio, while it has a defect of a narrow viewing angle of about 90°.

The liquid crystal display having the applied horizontal electric field type drives a liquid crystal of an in plane switch (hereinafter) mode by applying a horizontal electric field between the pixel electrode and the common electrode disposed in parallel on the lower substrate. The liquid crystal display using the horizontal electric field has an advantage of a wide viewing angle of about 160°. Hereinafter, the liquid crystal display using the horizontal electric field is explained in full detail.

The liquid crystal display using the horizontal electric field includes a thin film transistor array substrate (a lower substrate) and a color filter array substrate (an upper substrate) that face and join each other, a spacer for uniformly maintaining a cell gap between the two substrates and liquid crystal injected into a space provided by the spacer.

The thin film transistor array substrate includes a plurality of signal lines for forming a horizontal electric field by a pixel, a plurality of thin film transistors, and an alignment film for aligning the liquid crystal. The color filter array substrate includes a color filter for producing colors, a black matrix for preventing a light leakage and an alignment film applied for a liquid crystal alignment thereon.

A multi domain liquid crystal display panel has been proposed for aligning the liquid crystals in each pixel in a different direction from each other in order to compensate for a narrow viewing angle of the liquid crystal display.

Figure 1:
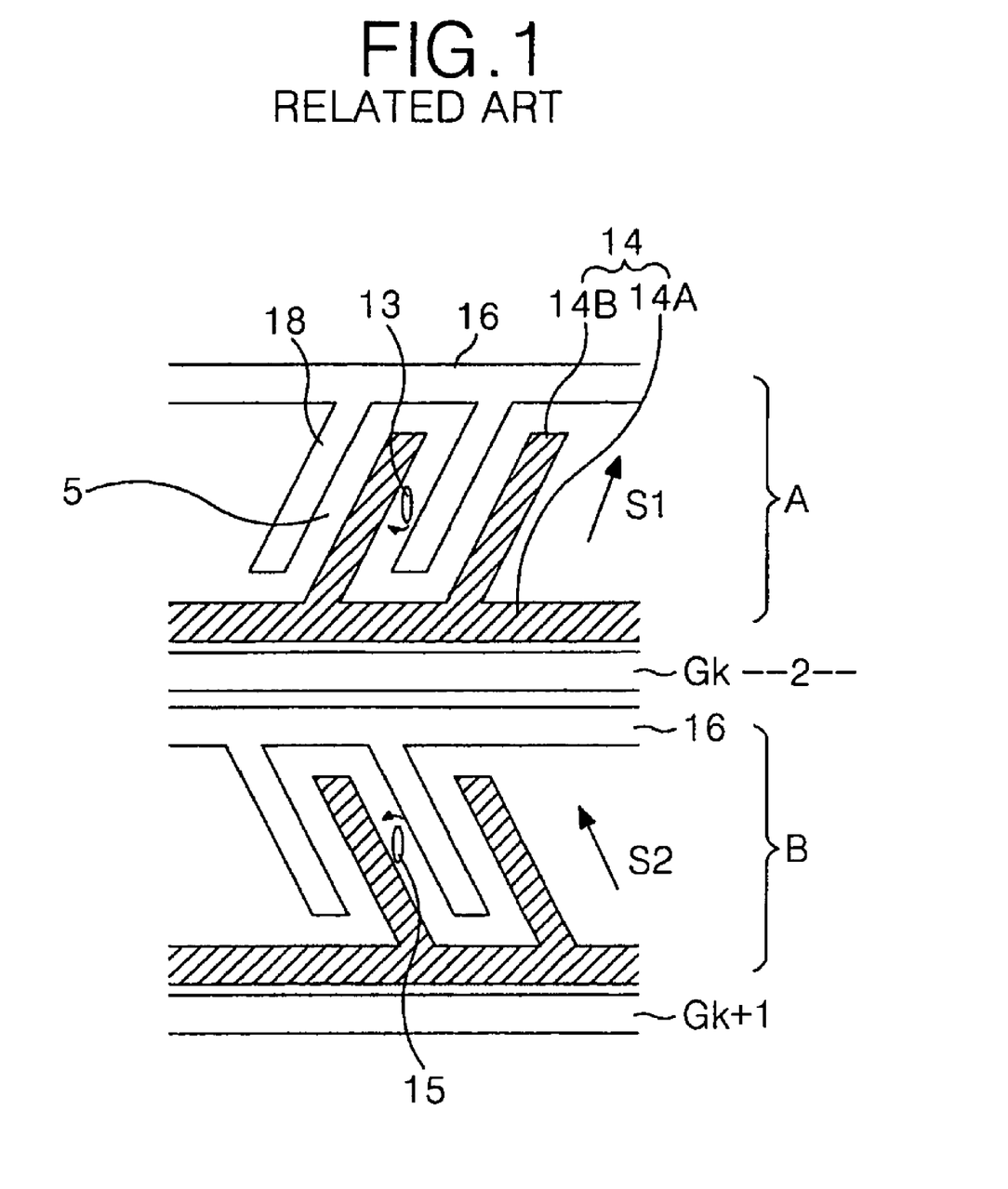
FIG. 1 is a plane view illustrating a portion of a thin film transistor array substrate of a liquid crystal display using a horizontal electric field according to the related art.

FIG. 1 is a plane view schematically illustrating a portion of the thin film transistor array substrate of the multi domain liquid crystal display panel using the horizontal electric field.

The thin film transistor array substrate shown in FIG. 1 comprises gate lines 2 and data lines (not shown) formed substantially perpendicular to one another on a lower substrate, a thin film transistor (not shown) formed for each interconnection part, pixel electrodes 14 and common electrodes 18 formed in order to apply the horizontal electric field in a pixel region 5 defined by the interconnection part and common lines 16 connected to common electrodes 18.

The gate line 2 supplies a gate signal to the gate electrode (not shown) of the thin film transistor. The data line supplies a pixel signal to the pixel electrode 14 via the drain electrode (not shown) of the thin film transistor. The gate line 2 and the data line 4 are formed in an interconnection structure to thereby define the pixel region 5.

The common line 16 formed in parallel with the gate line 2 with the pixel region 5 positioned between the common line 16 and the gate line 2 to supply a reference voltage for driving the liquid crystal to the common electrode 18.

The thin film transistor responds to the gate signal of the gate line 2 so that the pixel signal of the data line may be charged to the pixel electrode 14. To this end, the thin film transistor includes a gate electrode connected to the gate line 2, a source electrode (not shown) connected to the data line and a drain electrode connected to the pixel electrode 14.

The pixel electrode 14, which is connected to the drain electrode 12, comprises a horizontal part 14A formed in parallel with adjacent gate line 2 and a finger part 14B connected to the horizontal part 14A and formed in parallel with the common electrode 18. The finger part 14B of the pixel electrode is formed symmetrically with the pixel electrode 14 adjacent in association with the gate line 2 and is formed in parallel with the pixel electrode 14 adjacent with reference to the data line 4.

The common electrode 18 is connected to the common line 16 and is formed in the pixel region 5. Specifically, the common electrode 18 is formed in parallel with the finger-part 14B of the pixel electrode 14 in the pixel region 5.

Accordingly, a horizontal electric field is formed between the pixel electrode 14 to which the pixel signal is supplied via the thin film transistor and the common electrode 18 to which the reference voltage is supplied via the common line 16. Specifically, the horizontal electric field is formed between the finger part 14B of the pixel electrode 14 and the common electrode 18. The liquid crystal molecules 13 arranged in the horizontal direction between the thin film transistor array substrate and the color filter array substrate by the horizontal electric field rotate due to a dielectric anisotropy. The light transmittance transmitting the pixel region 5 differs in accordance with the amount of rotation of the liquid crystal molecules. Thus, the pictures can be represented.

Figure 2:
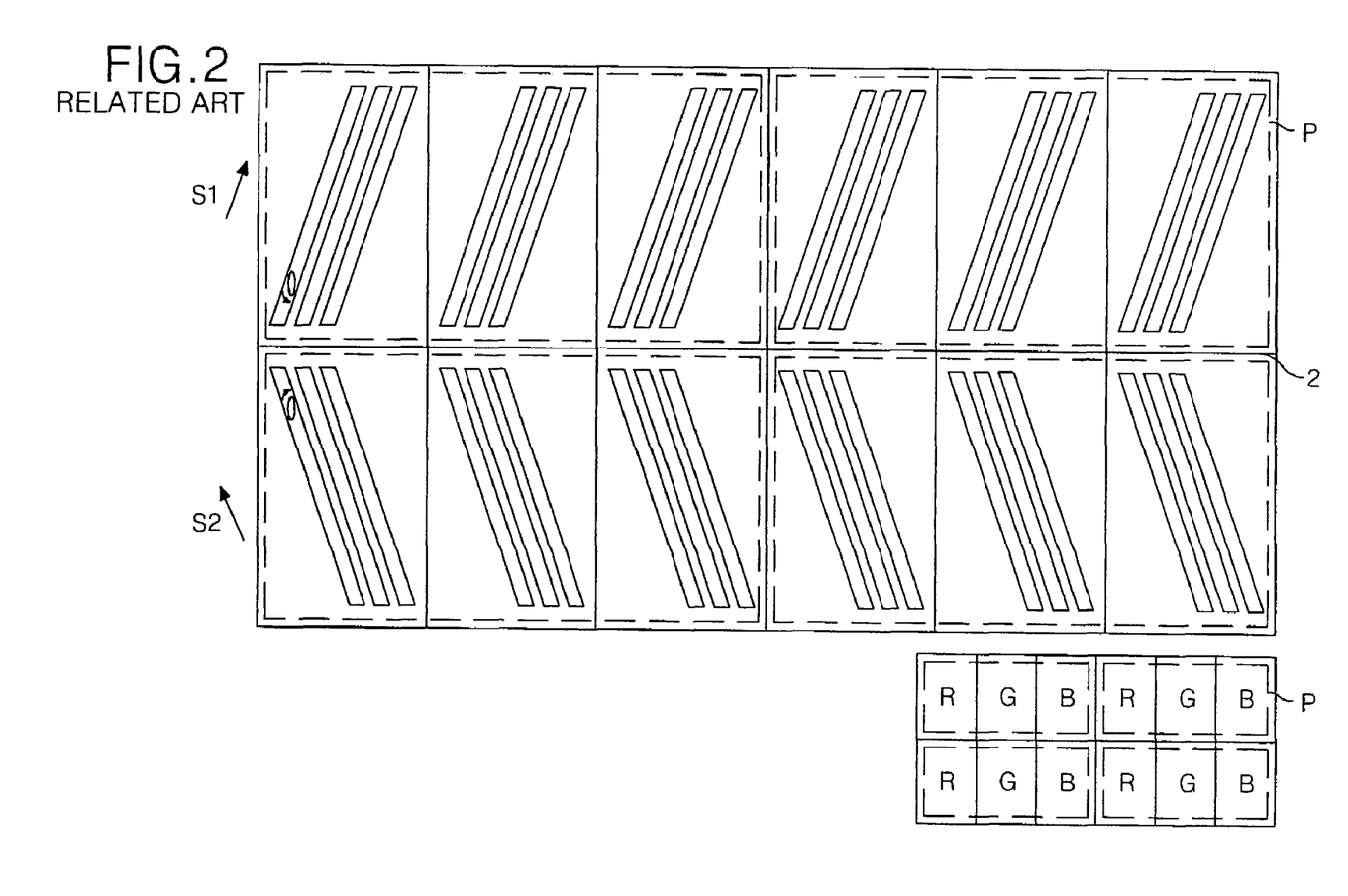
FIG. 2 is a diagram schematically illustrating a domain structure of a liquid crystal display panel using a horizontal electric field shown in FIG. 1.

In FIG. 2, in one aspect, the pixels are comprised of sub-pixels of R, G and B. The alignment direction of the liquid crystal molecules for each of the gate lines 2 is opposite to each other in order to improve the viewing angle. That is, the common electrode 18 and the pixel electrodes 14 of a first sub-pixel (A) connected to Kth gate line (GK) are tilted by a predetermined angle from the gate line 2 to a first direction (S1) and the common electrode 18 and the pixel electrodes 14 of a second sub-pixel (B) connected to Kth+1 gate line (GK+1) are tilted by a predetermined angle from the gate line 2 to a second direction (S2).

Accordingly, the direction of the liquid crystal molecules 13 located in the first sub-pixel (A) is opposite from an alignment direction of the liquid crystal 15 of the second sub-pixel (B).

The liquid crystal display of the horizontal electric field applying type according to the related art, as shown in FIG. 2, has an advantage that the viewing angle is excellent because of a 2-domain structure where the liquid crystal alignment direction is symmetrically aligned with reference to the gate line 2.

On the other hand, with respect to the liquid crystal display using vertical electric field and using horizontal electric field, one pixel is comprised of R, G and B sub-pixels. In each of the R, G and B sub-pixels, if a light quantity provided from a back light unit is 100%, a light quantity provided from the upper substrate via the color filter is about 27~33%. Thus, the brightness of the liquid crystal display panel of which each pixel is comprised of R, G and B sub-pixels is lowered respectively.

Figure 3:
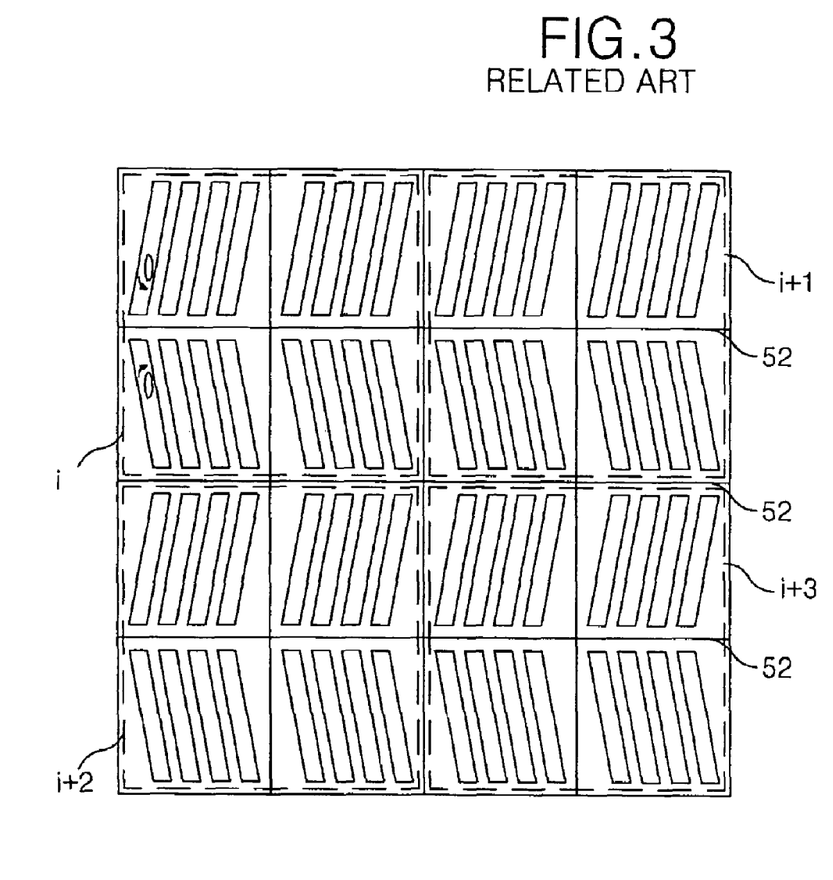
FIG. 3 is a diagram schematically illustrating a domain structure of a liquid crystal display panel using a horizontal electric field of a quad form.

To solve this problem, as shown in FIG. 3, a liquid crystal display having a structure where each of the pixels is comprised of the R, G, B and W sub-pixels has been proposed. With respect to the W sub-pixel of the liquid crystal display panel of the quad structure, if the light quantity provided from the back light unit is 100%, the light quantity provided from the upper substrate via a transparent color filter is more than about 95%. Accordingly, since the brightness lowered due to R, G and B sub-pixels may be compensated, the brightness of the liquid crystal display panel comprised of R, G, B and W sub-pixels may be improved as compared with the liquid crystal display panel comprised of R G and B sub-pixels.

Further, the number of driver ICs may be reduced by supplying two data signals (RW and GB) to one data line. With respect to each sub-pixel, the alignment directions of the liquid crystal molecules with reference to the gate line 52 are formed opposite to each other for compensating the viewing angle. That is, as shown in FIG. 3, the alignment directions of the liquid crystal molecules of each pixel of R sub-pixel and W sub-pixel and G sub-pixel and B sub-pixel are opposite each other.

However, in the R, G, B, W structure holding in common two gate lines 52, since the liquid crystal alignment direction of each sub-pixel of ith pixel is identical to that of each sub-pixel of (i+2) th pixel and the alignment direction of each sub-pixel of (i+1)th pixel is identical to that of each sub-pixel of (i+3)th pixel with reference to the gate line 52 respectively, it is difficult to compensate the viewing angle.

SUMMARY OF THE INVENTION

Accordingly, the present invention is directed to a liquid crystal display panel using a horizontal electric field capable of improving viewing angle and brightness.

To achieve these and other advantages and in accordance with the purpose of the present invention, as embodied and broadly described a liquid crystal display panel of a horizontal electric field applying type includes a plurality of pixels, wherein each pixel includes sub-pixels of red, green, blue and white, and a liquid crystal molecule alignment direction of each sub-pixel is different between vertically adjacent sub-pixels.

In another aspect of the present invention, each sub-pixel included in the plurality of pixels has the same liquid crystal alignment direction as horizontally adjacent sub-pixels.

In another aspect of the present invention, each sub-pixel included in the plurality of pixels has a different liquid crystal alignment direction between horizontally adjacent sub-pixels.

In another aspect of the present invention, the liquid crystal molecule alignment direction of each sub-pixel within the plurality of pixels is identical to each other in the horizontal direction.

The liquid crystal molecule alignment direction of the sub-pixels within each of the plurality of pixels is different from each other in the horizontal direction.

The liquid crystal alignment directions of the sub-pixels within each of the plurality of pixels is different from each other in the vertical direction.

In another aspect of the present invention, the liquid crystal display panel further includes a plurality of gate lines and data lines for defining pixel regions and sub-pixels included in the plurality of pixels.

The gate line includes the first and the second gate lines supplying gate signals to each of the plurality of pixels, and wherein each data lines include the first and the second data lines supplying data signals to each of the plurality of pixels.

The pixels include a first sub-pixel in a sub-pixel region defined by the first data line and the first gate line; a second sub-pixel defined in the sub-pixel region provided by the second data line and the first gate line; a first sub-pixel defined in the sub-pixel region defined by the first data line and the second gate line; and a first sub-pixel defined in the sub-pixel region defined by the second data line and the second gate line.

Each of the sub-pixels further includes a pixel electrode and a common electrode in parallel with the pixel electrode, and driving a horizontal electric field between the pixel electrode and the common electrode.

The liquid crystal alignment of the sub-pixels included in the pixel is determined by any one of the slanted directions of the pixel electrode and the common electrode.

Slanted directions of the pixel electrode and the common electrode of each sub-pixel included in the pixels are different from those of the pixel electrode and the common electrode of the sub-pixels included in a vertically adjacent pixel.

Slanted directions of the pixel electrode and the common electrode of each sub-pixel included in the pixel are each other identical. Those of the pixel electrode and the common electrode of the sub-pixel included in horizontally adjacent pixels.

Slanted directions of the pixel electrode and the common electrode of each sub-pixel included in the pixels are different from those of the pixel electrode and the common electrode of the sub-pixels included in vertically adjacent pixels.

The slanted directions of the pixel electrode and the common electrode of the sub-pixels within the pixels are identical to the pixel electrode and the common electrode of the sub-pixels.

The slanted directions of the pixel electrode and the common electrode of each sub-pixels within the pixel are different from those of the pixel electrode and the common electrode of the sub-pixels included in horizontally adjacent pixels.

The slanted directions of the pixel electrode and the common electrode of the sub-pixels within the pixel are different in the vertical direction.

In another aspect of the present invention, the data line includes a bend.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMETS

Reference will now be made in detail to the embodiments of the present invention, examples of which are illustrated in the accompanying drawings.

Hereinafter, with reference to FIGS. 4 to 8, various embodiments of the present invention will be explained.

Figure 4:
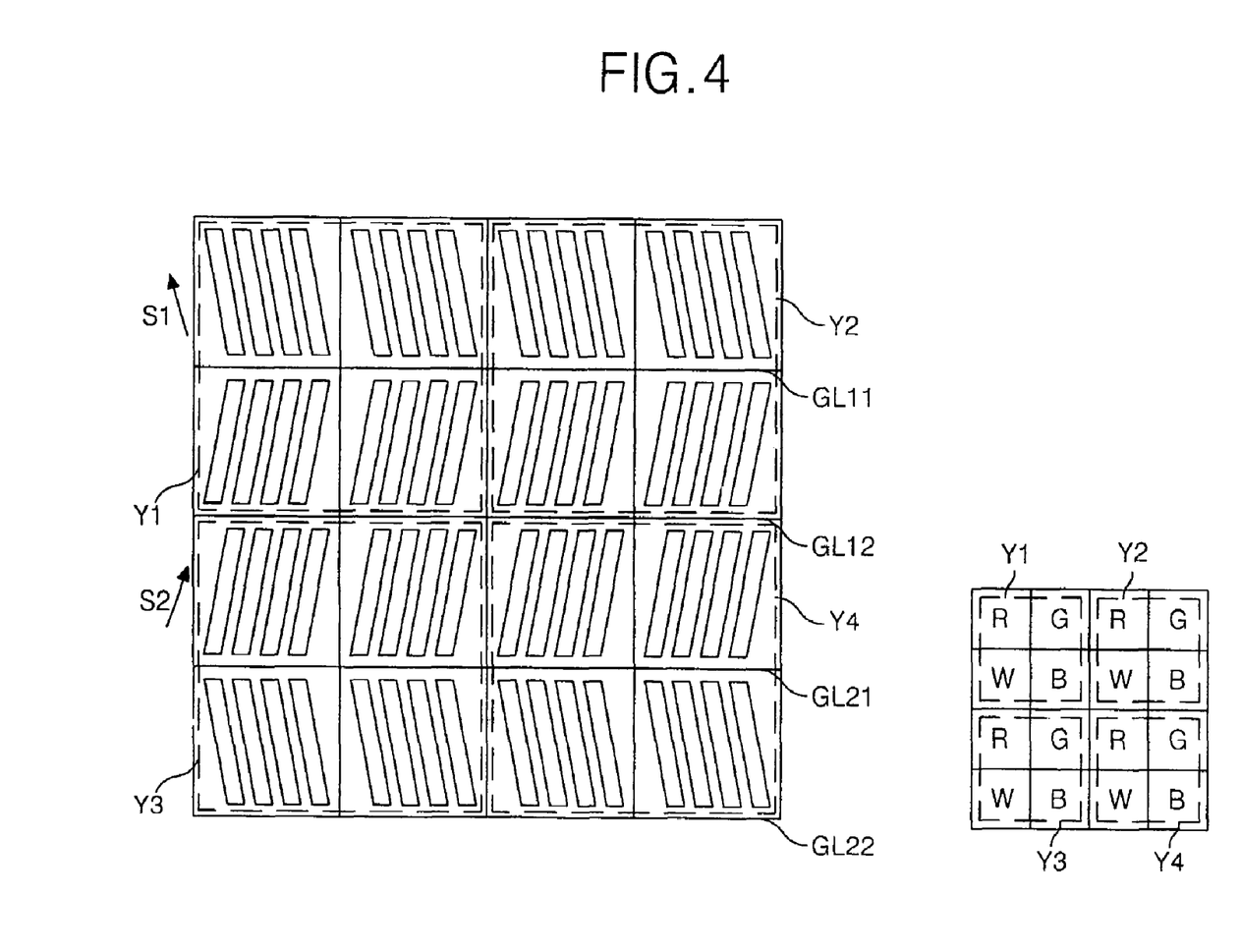
FIG. 4 is a diagram schematically illustrating a domain structure of a liquid crystal display panel using a horizontal electric field according to a first embodiment of the present invention.

FIG. 4 is a diagram illustrating a liquid crystal alignment direction of a liquid crystal display panel using a horizontal electric field applying type of a quad form according to a first embodiment of the present invention.

As shown in FIG. 4, a quad type of the liquid crystal panel comprises a, plurality of pixels Y1, Y2, Y3 and Y4, each one of which R and G sub-pixels connected to a first odd-numbered gate line GL11 and W and B sub-pixels connected to a first even-numbered gate line GL12. Each pixel has a different liquid crystal domain in which the pixels are adjacent in a vertical direction and have two gate lines (GL). That is, the pixels comprised of R, G, B and W sub-pixel, in association with a first even-numbered gate line GL12 have alignment directions of liquid crystal molecules which are opposite each other. To this end, common electrodes 118 and pixel electrodes 114 of R and G sub-pixels connected to the first odd-numbered gate line GL11 are formed in a slanting direction by a predetermined angle with the gate line GL in a first direction S1 and common electrodes and pixel electrodes of R, G sub-pixels connected to the second odd-numbered gate line GL21 are formed in a slanting direction by the predetermined angle with the gate line GL in a second direction S2.

Further, common electrodes and pixel electrodes of B and W sub-pixels that are connected to the first even-numbered gate line GL12 are formed in a slanting direction by the predetermined angle with the gate line GL in the second direction S2 and common electrodes 118 and pixel electrodes 114 of B and W sub-pixels connected to the second even-numbered gate line GL22 are formed in a slanting direction by the predetermined angle with the gate line to the first direction S1.

Figure 5A:
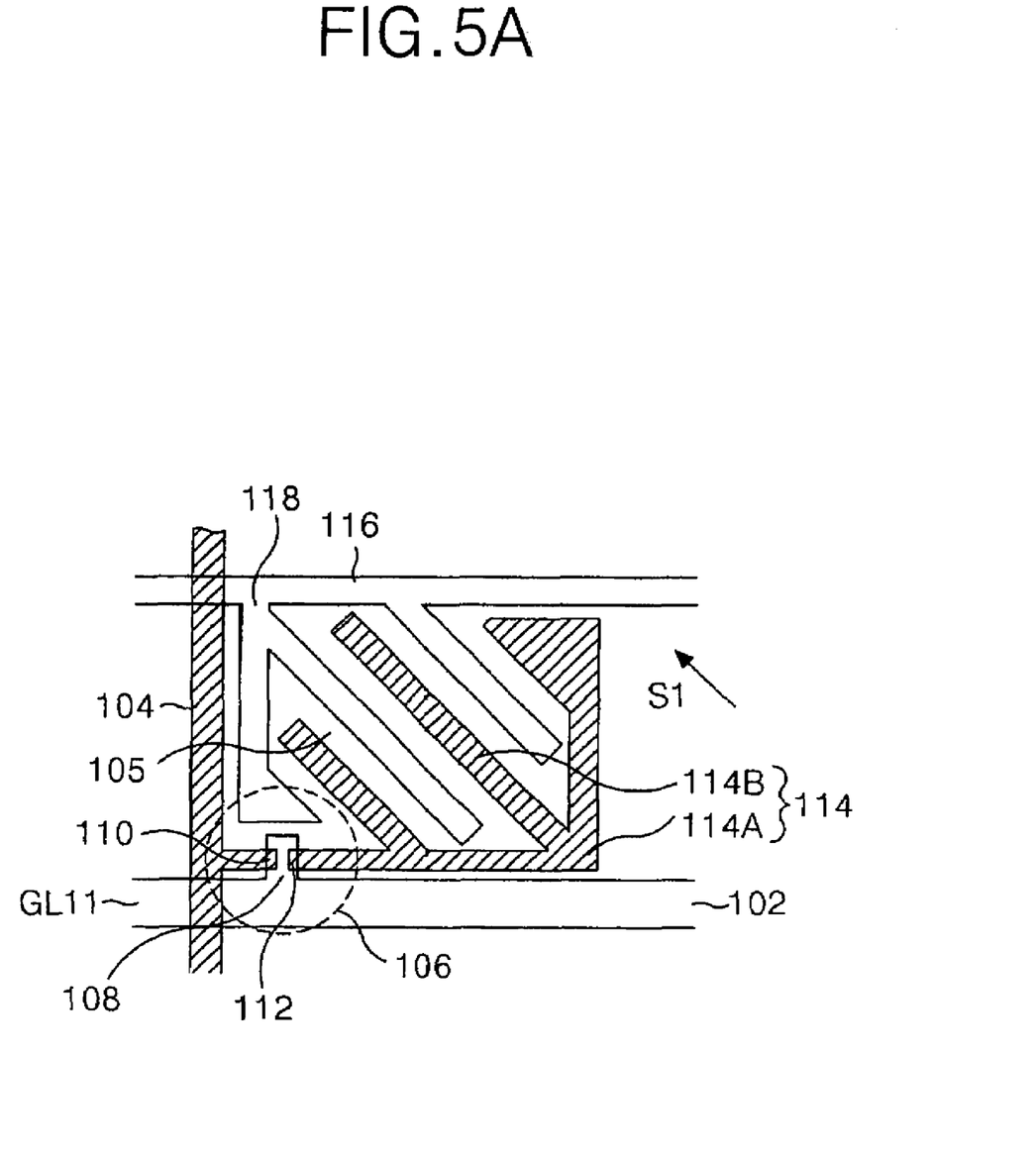
FIGS. 5A and 5B are diagrams illustrating a thin film transistor array substrate of a liquid crystal display panel using a horizontal electric field according to a first embodiment of the present invention.
Figure 5B:
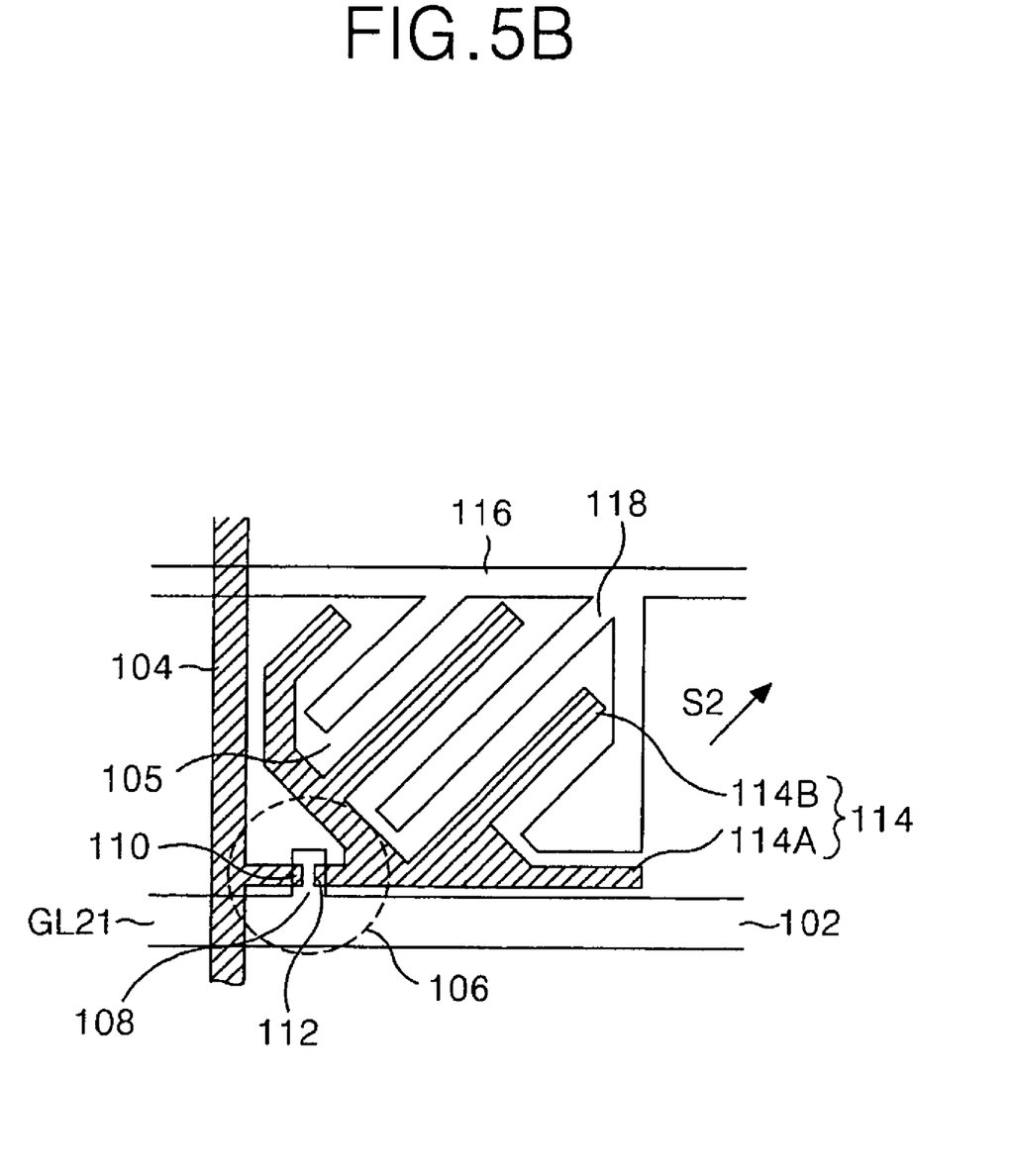

FIGS. 5A and 5B are diagrams particularly illustrating a R sub-pixel of a first pixel Y1 and a R sub-pixel of a third pixel (Y3) shown in FIG. 4 respectively.

The thin film transistor array substrate shown in FIGS. 5A and 5B, comprises a gate line 102 and a data line 104 that cross on a lower substrate, a thin film transistor 106 formed at each crossing of the gate and data lines, a pixel electrode 114 and common electrodes 118 formed to apply the horizontal electric field in a pixel region 105 formed by the crossing patterning of the data and gate lines common line 116 connected to the common electrode 118.

Figure 6:
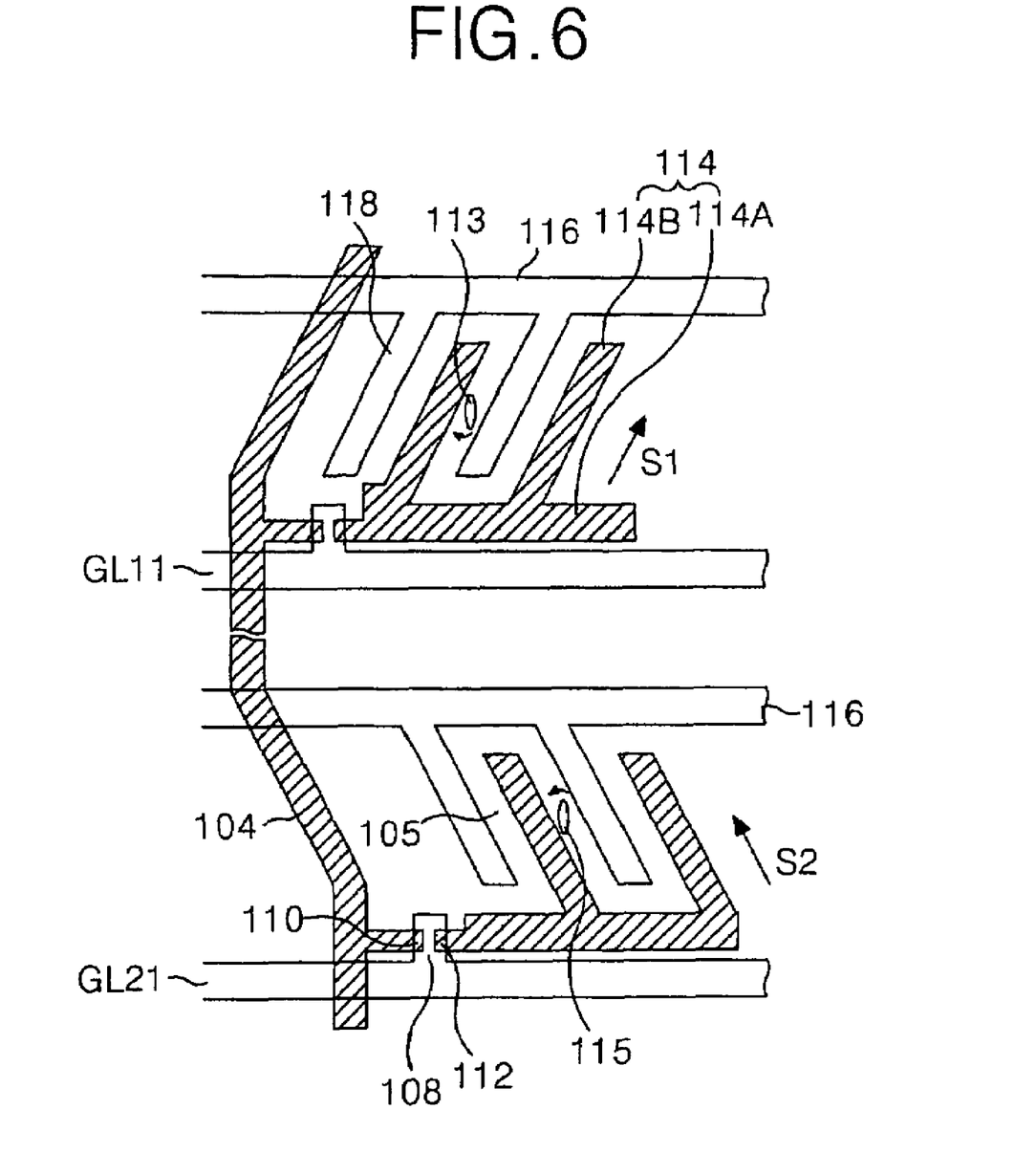
FIG. 6 is a cross sectional view illustrating another form of a data line shown in FIGS. 5A and 5B.

The gate line 102 supplies a gate signal to the gate electrode 108 of the thin film transistor 106. The data line 104 supplies a pixel signal to the pixel electrode 114 via the drain electrode 112 of the thin film transistor 106. The data line 104 is formed in a vertical direction with respect to the gate line 102 or as shown in FIG. 6, is formed in a slanting direction based upon the predetermined angle and in parallel with the pixel electrode 114 and the common electrode 118 which are also in a slanting direction. The gate line 102 and the data line 104 define the pixel region 105 as being formed in intercrossing structure.

The common line 116 puts the pixel region 105 therebetween and is formed in parallel with the gate line 102 to supply a reference voltage for driving the liquid crystal to the common electrode 118.

The thin film transistor 106 responds to the gate signal of the gate line 102 so that the pixel signal of the data line may be charged to the electric field 113. To this end, the thin film transistor 106 comprises the gate electrode 108 connected to the gate line 102, a source electrode 110 connected to the data line 104 and a drain electrode 112 connected to the pixel electrode 114. Further, the thin film transistor 106 is overlapped as putting the gate electrode 108 and the gate insulation film (not shown) therebetween and includes an active layer (not shown) that forms a channel between the source electrode 110 and the drain electrode 112. An ohmic contact layer is further formed for ohmic contact with the data line 104, the source electrode 110 and the drain electrode 112 on the active layer.

The pixel electrode 114 is connected to the drain electrode 112 and comprises a horizontal part 114A formed in parallel with adjacent gate line 102 and a finger part 114B connected to the horizontal part 114A and formed in parallel with the common electrode 118. The finger part 114B of the pixel electrode 114 is formed in a slanting direction based upon the predetermined angle in one direction.

The common electrode 118 is connected to the common line 116 and is formed in the pixel region 105. Specifically, the common electrode 118 is formed in a slanting direction based upon the predetermined angle in parallel with the finger part 114B of the pixel electrode 114 in the pixel region 105 as having the same period with the finger part 114B of the pixel electrode. That is, the pixel electrode 114 and the common electrode 118 formed in the R sub-pixel of the first pixel Y1, as shown in FIG. 5A, are formed in a slanting direction based upon the predetermined angle in the first direction S1 and the pixel electrode 114 and the common electrode 118 formed in the R sub-pixel of the third pixel Y3, as shown in FIG. 5B, are formed in a slanting direction based upon the predetermined angle in the first direction S2.

Accordingly, a horizontal electric field is formed between the pixel electrode 114 to which the pixel signal is supplied via the thin film transistor 106 and the common electrode 118 to which the reference voltage is supplied via the common line 116. Specifically, the horizontal electric field is formed between the finger part 114B of the pixel electrode 114 and the common electrode 118. The liquid crystal molecules 113 and 115 arranged in the horizontal direction between the thin film transistor array substrate and the color filter array substrate by the horizontal electric field rotate due to a dielectric anisotropy. The light transmittance transmitting with the pixel region 105 differs in accordance with a rotation amount of the liquid crystal molecules and thereby the pictures can be represented.

In one aspect of the liquid crystal display of the horizontal electric field applying type according to the first embodiment of the present invention, the liquid crystal of R, G, B and W sub-pixels of the first and the third pixels Y1 and Y3 and the liquid crystal of R, G, B and W sub-pixels of the second and the fourth pixels Y2 and Y4 are aligned symmetrically in association with the gate line GL12 dividing the first and the third pixels Y1 and Y3, and the second and the fourth pixels Y2 and Y4.

More specifically, the liquid crystal of R sub-pixel of the first pixel Y1 (or the second pixel Y2) and the liquid crystal of R sub-pixel of the third pixel Y3 (the fourth pixel Y4) are aligned symmetrically and respectively in association with the gate line GL.

The liquid crystal of G sub-pixel of the first pixel Y1 (or the second pixel Y2) and the liquid crystal of G sub-pixel of the third pixel Y3 (or the fourth pixel Y4) are aligned symmetrically and respectively in association with the gate line GL.

The liquid crystal of B sub-pixel of the first pixel Y1 (or the second pixel Y2) and the liquid crystal of B sub-pixel of the third pixel Y3 (or the fourth pixel Y4) are aligned symmetrically and respectively in association with the gate line GL.

The liquid crystal of W sub-pixel of the first pixel Y1 (or the second pixel Y2) and the liquid crystal of W sub-pixel of the third pixel Y3 (or the fourth pixel Y4) are aligned symmetrically and respectively in association with the gate line GL.

Since the alignment directions of the liquid molecules are opposite to each other for each of the horizontally adjacent sub-pixels, a viewing angle of the liquid crystal display may be inproved.

Figure 7:
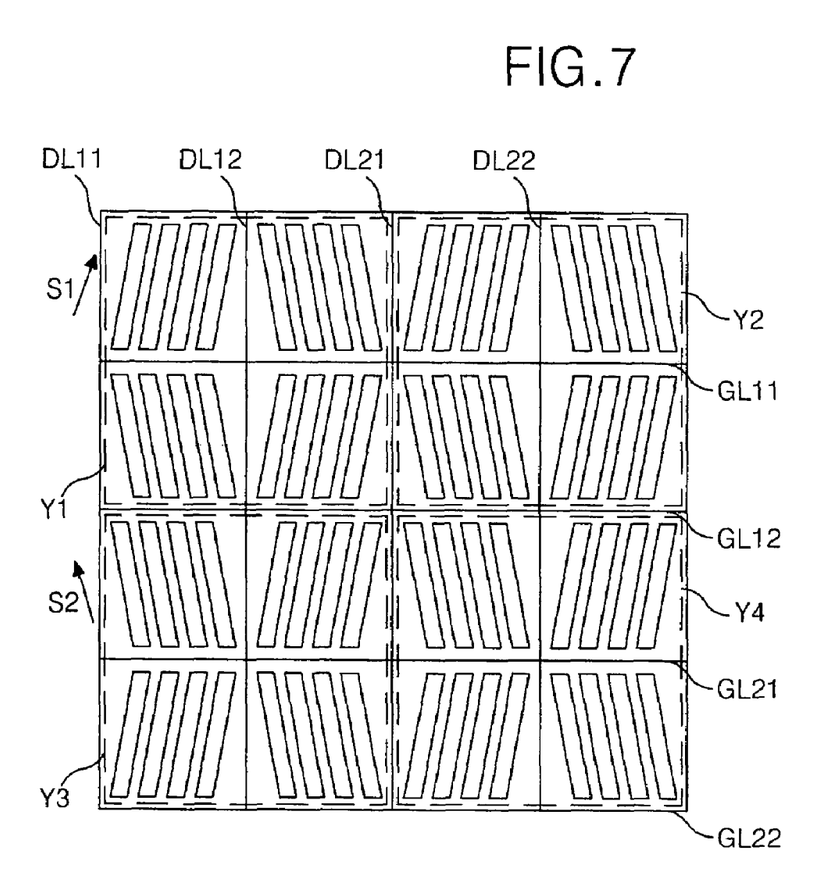
FIG. 7 is a diagram schematically illustrating a domain structure of a liquid crystal display panel using a horizontal electric field according to a second embodiment of the present invention.

FIG. 7 is a diagram illustrating the liquid crystal alignment direction of the liquid crystal display panel of the horizontal electric field applying type according to a second embodiment of the present invention.

In one aspect of the liquid crystal display panel of the quad type shown in FIG. 7, one pixel comprises R and G sub-pixels connected to the first odd-numbered gate line GL11 and W and B sub-pixels connected to the first even-numbered gate line GL12. Each pixel has a different liquid crystal domain for each of the pixels adjacent in the vertical direction and two gate lines. That is, in one aspect of the pixels comprised of R, G, B and W sub pixels, the alignment direction of the liquid crystal molecules is opposite to each other in association with the first even-numbered gate line GL12. To this end, the common electrode and the pixel electrodes of R and G sub-pixels connected to the first odd-numbered gate line GL11 are formed in a slanted direction based upon a predetermined angle with the gate line GL in the first and the second directions S1 and S2 respectively and the common electrode and the pixel electrodes of R and G sub-pixels connected to the second odd-numbered gate line GL21 are formed in a slanted direction based upon a angle with the gate line GL in the second and the first directions S2 and S1 respectively.

Further, the common electrode and the pixel electrodes of B and W sub-pixels connected to the first even-numbered gate line GL12 are formed in a slanted direction by the predetermined angle with the gate line GL in the first and the second directions S1 and S2 respectively and the common electrode and the pixel electrodes of B and W sub-pixels connected to the second even-numbered gate line GL22 are formed in a slanted direction by the predetermined angle with the gate line GL in the second and the first directions S2 and S1 respectively.

In one aspect of the liquid crystal display of the horizontal electric field applying type according to the second embodiment of the present invention, the liquid crystal of R, G, W sub-pixels of the first and the third pixels Y1 and Y3 and the liquid crystal of R, G, B and W sub-pixels of the second and the fourth pixels Y'2 and Y4 are aligned symmetrically in association with the gate line GL dividing the first and the third pixels Y1 and Y3, and the second and the fourth pixels Y2 and Y4.

More specifically, the liquid crystal of R sub-pixel of the first pixel. Y1 (or the second pixels Y2) and the liquid crystal of R sub-pixel of the third pixel Y3 (or the fourth pixel Y4) are aligned symmetrically and respectively in association with the gate line GL.

The liquid crystal of G sub-pixel of the first pixel Y1 (or the second pixel Y2) and the liquid crystal of G sub-pixel of the third pixel Y3 (or the fourth pixel (Y4) are aligned symmetrically and respectively in association with the gate line GL.

The liquid crystal of B sub-pixel of the first pixel Y1 (or the second pixels Y2) and the liquid crystal of B sub-pixel of the third pixel Y3 (or the fourth pixel Y4) are aligned symmetrically and respectively in association with the gate line GL.

The liquid crystal of W sub-pixel of the first pixel Y1 (or the second pixel Y2) and the liquid crystal of W sub-pixel of the third pixel Y3 (the fourth pixel Y4) are aligned symmetrically and respectively in association with the gate line GL.

Further, the liquid crystal of R and W sub-pixel of each pixel and the liquid crystal of G and B sub-pixel are aligned symmetrically and respectively in association with the data line.

Since the alignment direction of the liquid molecules are opposite to each other for each of the two gate lines, each of the sub-pixels of the pixels adjacent in the horizontal direction may improve a viewing angle.

Figure 8:
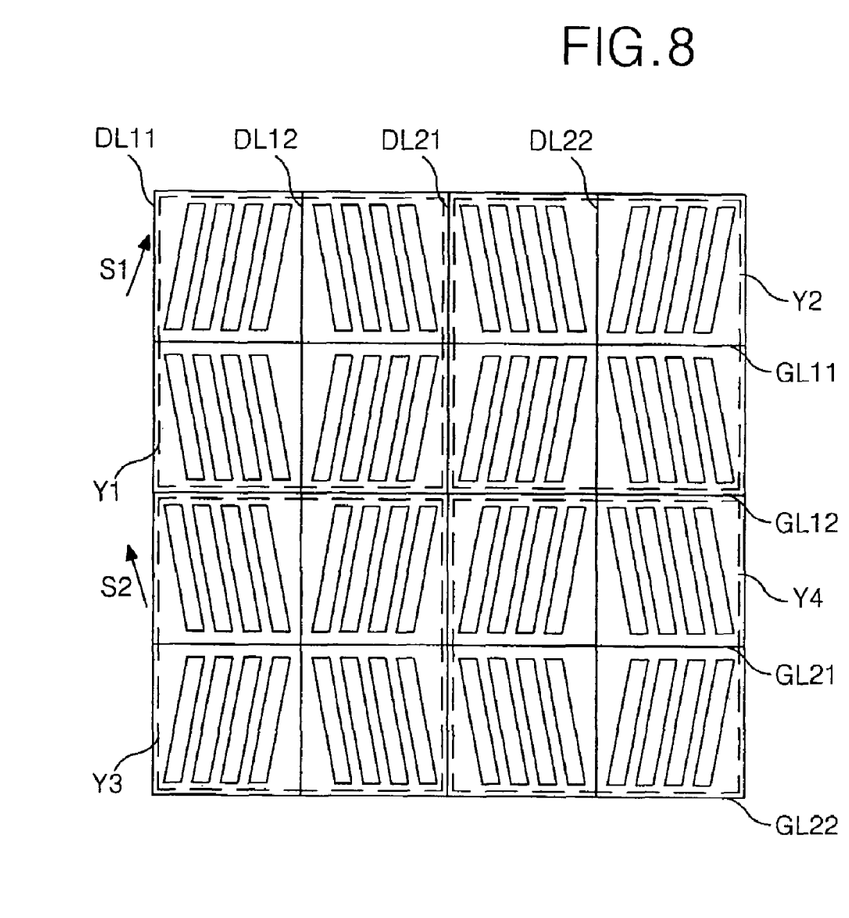
FIG. 8 is a diagram schematically illustrating a domain structure of a liquid crystal display panel using a horizontal electric field according to a third embodiment of the present invention.

FIG. 8 is a diagram illustrating the liquid crystal alignment direction of the liquid crystal display panel of the horizontal electric field applying type according to a third embodiment of the present invention.

In one aspect of the liquid crystal display panel of the quad type shown in FIG. 8, one pixel comprises R and G sub-pixels connected to the first odd-numbered gate lines GL11 and W and B sub-pixels connected to the first even-numbered gate line GL12. Each pixel has a different liquid crystal domain then each of the pixel adjacent in the vertical direction and two gate lines. That is, in one aspect of the pixels comprised of R, G, B and W sub pixels, the alignment direction of the liquid crystal molecule is opposite to each other in association with the first even-numbered gate line GL12. To this end, the common electrode and the pixel electrodes of R and G sub-pixels connected to the first and the second odd-numbered gate line GL11 are formed in a slanted direction by the predetermined angle with the gate line GL in the first and the second directions S1 and S2 respectively and the common electrode and the pixel electrodes of R and G sub-pixels connected to the second odd-numbered gate line GL21 are formed in a slanted direction based upon the predetermined fined angle with the gate line GL in the second and the first directions S2 and S1 respectively.

Further, the common electrode and the pixel electrodes of B and W sub-pixels connect to he first even-numbered gate line GL12 are formed by the predetermined angle with the gate line GL in the first and the second directions S1 and S2 respectively and the common electrode and the pixel electrodes of B and W sub-pixels connected to the second even-numbered gate line GL22 are formed in a slanted direction by the predetermined angle with the gate line GL in the second and the first directions S2 and S1 respectively.

Each pixel has a different liquid crystal domain from the pixels adjacent in the horizontal direction. That is, in one aspect to the pixels comprised of R, G, B and W sub-pixels, the alignment direction of the liquid crystal molecules are opposite to each other in association with the second odd-numbered data line DL21. That is, the common electrode and the pixel electrodes of R and W sub-pixels connected to the second odd-numbered data line DL21 are formed in a slanted direction by the predetermined angle with the gate line GL in the first and the second directions S1 and S2 respectively and the common electrode and the pixel electrodes of R and W sub-pixels connected to the second odd-numbered data line DL21 are formed in a slanted direction by the predetermined angle with the gate line GL in the second and the first directions S2 and S1 respectively.

Further, the common electrode and the pixel electrodes of G and B sub-pixels connected to the first even-numbered data line DL12 are formed in a slanted direction by the predetermined angle with the gate line GL in the first and the second directions S1 and S2 respectively and the common electrode and the pixel electrodes of G and B sub-pixels connected to the first even-numbered data line DL12 are formed in a slanted direction by the predetermined angle with the gate line GL in the second and the first directions S2 and S1 respectively.

Since the alignment direction of the liquid molecules are opposite to each other, each of the sub-pixels of the pixels adjacent in the horizontal direction may improve the viewing angle pf the liquid crystal display.

In one aspect of the liquid crystal display of the horizontal electric field applying type according to the third embodiment of the present invention, the liquid crystal molecules of R, G, B, W sub-pixels the first and the third pixels Y1 and Y3 and the liquid crystal molecules of R, G, B and W sub-pixels of the second and the fourth pixels Y2 and Y4 are aligned symmetrically in association with the gate line GL dividing the first and the third pixels Y1 and Y3, and the second and the fourth pixels Y2 and Y4.

More specifically, the liquid crystal molecules of R sub-pixel of the first pixel Y1 (or the second pixel Y2) and the liquid crystal molecules of R sub-pixel of the third pixel Y3 (or the fourth pixel Y4) are aligned symmetrically and respectively in association with the gate line GL.

The liquid crystal of G sub-pixel of the first pixel Y1 (or the second pixel Y2) and the liquid crystal of G sub-pixel of the third pixel Y3 (or the fourth pixel Y4) are aligned symmetrically and respectively in association with the gate line GL.

The liquid crystal of B sub-pixel of the first pixel Y1 (or the second pixel Y2) and the liquid crystal of B sub-pixel of the third pixel Y3 (or the fourth pixel Y4) are aligned symmetrically and respectively in association with the gate line GL.

The liquid crystal of W sub-pixel of the first pixel Y1 (or the second pixel Y2) and the liquid crystal of W sub-pixel of the third pixel Y3 (or the fourth pixel Y4) are aligned symmetrically and respectively in association with the gate line GL.

Further, the liquid crystal alignment of R, G, B and W sub-pixels of each pixel and horizontally adjacent liquid crystal alignment of R, G, B and W sub-pixels are respectively and symmetrically aligned in association with the data line DL.\

Since the alignment direction of the liquid molecules are opposite to each other for each of the gate each of the sub-pixels of the pixels adjacent in the horizontal direction may improve the viewing angle.

As described above, in one aspect of the liquid crystal display panel of the horizontal electric field applying type according to the present invention, the liquid crystal of the pixels comprised of at least four sub-pixels and the liquid crystal of the pixels comprised of vertically adjacent at least four sub-pixels are aligned opposite to each other for each of two gate lines. Thus the viewing angle may be improved.

Further, since each pixel includes a white sub-pixel comprised of a transparent resin, the brightness may be improved.

Although the present invention has been explained by the embodiments shown in the drawings described above, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel comprising a plurality of pixels having an applied horizontal electric field, wherein each of the plurality of pixels are divided into at least four sub-pixels of a 2×2 matrix array, and wherein a liquid crystal molecule alignment direction of each sub-pixel is different from a liquid crystal molecule alignment of each of the sub-pixels of a vertically adjacent pixel, respectively.

2. The liquid crystal display panel according to claim 1, wherein each sub-pixel included in the plurality of pixels has the same liquid crystal alignment direction as horizontally adjacent sub-pixels.

3. The liquid crystal display panel according to claim 1, wherein each sub-pixel included in the plurality of pixels has a different liquid crystal alignment direction between horizontally adjacent sub-pixels.

4. The liquid crystal display panel according to claim 1, wherein the liquid crystal molecule alignment direction of each sub-pixel within the plurality of pixels is identical to each other in the horizontal direction.

5. The liquid crystal display panel according to claim 1, wherein the liquid crystal molecule alignment direction of the sub-pixels within each of the plurality of pixels is different from each other in the horizontal direction.

6. The liquid crystal display panel according to claim 1, wherein the liquid crystal molecule alignment direction of the sub-pixels within each of the plurality of pixels is different from each other in the vertical direction.

7. The liquid crystal display panel according to claim 1, further comprising a plurality of gate lines and data lines for defining pixel regions and the sub-pixels included in the plurality of pixels.

8. The liquid crystal display panel according to claim 7, wherein the data lines are formed to include a bent portion.

9. The liquid crystal display panel according to claim 7, wherein the gate lines include first and the second gate lines supplying gate signals to each of the plurality of pixels, and wherein the data lines include first and second data lines supplying data signals to each of the plurality of pixels.

10. The liquid crystal display panel according to claim 9, wherein the plurality of pixels include:
   a first sub-pixel in a sub-pixel region of the pixel provided by the first data line and the first gate line;
   a second sub-pixel in the sub-pixel region of the pixel defined by the second data line and the first gate line;
   a third sub-pixel formed in the sub-pixel region of the pixel provided by the first data line and the second gate line; and
   a fourth sub-pixel formed in the sub-pixel region of the pixel provided by the second data line and the second gate line.

11. The liquid crystal display panel according to claim 1, wherein each of the sub-pixels includes a pixel electrode and a common electrode in parallel with the pixel electrode, wherein a horizontal electric field is formed between the pixel electrode and the common electrode.

12. The liquid crystal display panel according to claim 11, wherein a liquid crystal alignment of the sub-pixels included in the pixel is determined by any one of slanted directions of the pixel electrode and the common electrode.

13. The liquid crystal display according to claim 12, wherein the slanted directions are defined by a predetermined angle.

14. The liquid crystal display panel according to claim 11, wherein slanted directions of the pixel electrode and the common electrode of each sub-pixel included in the pixels are different from those of the pixel electrode and the common electrode of the sub-pixels included in vertically adjacent pixels.

15. The liquid crystal display panel according to claim 11, wherein slanted directions of the pixel electrode and the common electrode of each sub-pixel included in the pixels are identical to those of the pixel electrode and the common electrode of the sub-pixels included in horizontally adjacent pixels.

16. The liquid crystal display panel according to claim 11, wherein slanted directions of the pixel electrode and the common electrode of each sub-pixel included in the pixels are different from those of the pixel electrode and the common electrode of the sub-pixels included in horizontally adjacent pixels.

17. The liquid crystal display panel according to claim 11, wherein slanted directions of the pixel electrode and the common electrode of the sub-pixels within the pixels are each identical in a horizontal direction.

18. The liquid crystal display panel according to claim 11, wherein slanted directions of the pixel electrode and the common electrode of the sub-pixels within the pixels are each different in a horizontal direction.

19. The liquid crystal display panel according to claim 11, wherein slanted directions of the pixel electrode and the common electrode of the sub-pixels within the pixels are each different in a vertical direction.

20. The liquid crystal display according to claim 11, wherein the pixel electrode includes a horizontal portion in parallel with the an adjacent gate line.

* * * * *